(12) United States Patent
Oslislok et al.

(10) Patent No.: US 9,121,342 B2
(45) Date of Patent: Sep. 1, 2015

(54) CLIMATICALLY CONTROLLED BOX

(75) Inventors: Miroslaw Oslislok, Leonberg (DE);
Bjoern Pehnert, Berlin (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/008,828

(22) PCT Filed: Mar. 7, 2012

(86) PCT No.: PCT/EP2012/001001
§ 371 (c)(1),
(2), (4) Date: Sep. 30, 2013

(87) PCT Pub. No.: WO2012/139686
PCT Pub. Date: Oct. 18, 2012

(65) Prior Publication Data
US 2014/0034005 A1   Feb. 6, 2014

(30) Foreign Application Priority Data

Apr. 12, 2011  (DE) .......................... 10 2011 001 992

(51) Int. Cl.
*F02B 63/00* (2006.01)
*F02B 77/00* (2006.01)
*B60H 1/00* (2006.01)
*B60H 1/32* (2006.01)

(52) U.S. Cl.
CPC ............ *F02B 77/00* (2013.01); *B60H 1/00264* (2013.01); *B60H 1/00392* (2013.01); *B60H 1/3204* (2013.01); *B60H 1/3226* (2013.01)

(58) Field of Classification Search
CPC .. B60H 1/00392; B60H 1/3226; F25D 16/00; F02B 77/00
USPC ............... 123/142.5 R, 142.5 E; 290/1 B, 51; 165/104.34, 104.14
See application file for complete search history.

(56) References Cited

U.S. PATENT DOCUMENTS

| 7,007,491 | B2 * | 3/2006 | Grimm et al. ................... 62/230 |
| 7,434,611 | B2 | 10/2008 | Wunderlich et al. |
| 7,614,368 | B2 * | 11/2009 | Gehres et al. .............. 123/41.08 |
| 8,276,694 | B2 * | 10/2012 | Stervik et al. .............. 180/65.22 |
| 8,567,354 | B2 * | 10/2013 | Kealy et al. ....................... 123/2 |
| 8,593,002 | B2 * | 11/2013 | Hamm et al. .................. 290/1 A |
| 8,602,143 | B2 * | 12/2013 | Theobald et al. .......... 180/65.22 |
| 2003/0192952 | A1 * | 10/2003 | Horn et al. ....................... 236/10 |

(Continued)

FOREIGN PATENT DOCUMENTS

DE   195 39 517   3/1996
DE   102 18 901   11/2003

(Continued)

OTHER PUBLICATIONS

International Search Report of May 7, 2012.

*Primary Examiner* — Lindsay Low
*Assistant Examiner* — Long T Tran
(74) *Attorney, Agent, or Firm* — Gerald E. Hespos; Michael J. Porco; Matthew T. Hespos

(57) ABSTRACT

A climate control box for a motor vehicle has a heating device (18) and a cooling device. To increase the range of motor vehicles that have at least one electric drive device, an internal combustion engine (4) is arranged in the climate control box (1).

9 Claims, 2 Drawing Sheets

(56) References Cited

U.S. PATENT DOCUMENTS

| | | | |
|---|---|---|---|
| 2005/0035657 A1* | 2/2005 | Brummett et al. | 307/10.1 |
| 2006/0185837 A1* | 8/2006 | Horn et al. | 165/203 |
| 2007/0256737 A1* | 11/2007 | Janarthanam et al. | 137/386 |
| 2009/0217667 A1* | 9/2009 | Niiyama et al. | 60/670 |
| 2009/0229649 A1* | 9/2009 | Yang et al. | 136/201 |
| 2010/0126188 A1 | 5/2010 | Clarke | |
| 2010/0205990 A1 | 8/2010 | French et al. | |
| 2011/0187123 A1* | 8/2011 | Hamm et al. | 290/1 A |
| 2011/0251019 A1* | 10/2011 | Ulrey et al. | 477/98 |

FOREIGN PATENT DOCUMENTS

| | | |
|---|---|---|
| DE | 102 18 157 | 1/2004 |
| EP | 1 527 919 | 5/2005 |

* cited by examiner

CLIMATICALLY CONTROLLED BOX

BACKGROUND

1. Field of the Invention

The invention relates to a climate control box for a motor vehicle, having a heating device and a cooling device. Furthermore, the invention relates to a motor vehicle having at least one electric drive device and having a climate control box of this type. Moreover, the invention relates to a method for operating a climate control box in a motor vehicle of this type.

2. Description of the Related Art

German laid open specification DE 102 18 901 A1 has disclosed a mobile heating device having a burner, a heat exchanger and a heating air feed means for a vehicle having a fan in an air conditioning system. German laid open specification DE 102 18 157 A1 has disclosed a burner heating device having a heat exchanger for discharging the thermal energy that is generated at a burner for a vehicle having a climatically controlled box in an air conditioning system. German laid open specification DE 195 39 517 A1 has disclosed a compact air conditioning module for motor vehicles, having a fan, a heat exchanger that can be heated electrically or by means of fuel, and a compact air conditioning system, in which, instead of spatially separated additional/useful heating devices and air conditioning systems in motor vehicles, they are combined to form one compact structural unit.

It is an object of the invention to increase the range of motor vehicles that comprise at least one electric drive device.

SUMMARY OF THE INVENTION

In a climate control box for a motor vehicle, having a heating device and a cooling device, the object is achieved by virtue of the fact that an internal combustion engine is arranged in the climate control box. The internal combustion engine is a heat engine, in which heat is generated and is converted into mechanical work directly in the machine system, for example by combustion of a fuel/air mixture. The internal combustion engine is also called a combustion engine or a combustion motor. A power output of 5 kW, for example, can be generated by way of the internal combustion engine. The integration of the internal combustion engine produces a self-sufficient climate control box that can be operated in a motor vehicle without consuming the drive power of the motor vehicle. This affords the advantage that the range of the motor vehicle in an electric mode, in which the motor vehicle is driven by an electric drive device, is not impaired by the operation of the climate control box.

One preferred exemplary embodiment of the climate control box is distinguished by the fact that a generator is arranged in the climate control box and is drive-connected to the internal combustion engine. The generator is preferably coupled mechanically to the internal combustion engine. The generator is normally driven via the internal combustion engine. However, it is also possible to drive the internal combustion engine with the aid of the generator, in particular to start it. For this purpose, the climate control box can advantageously also contain a battery.

One further preferred exemplary embodiment of the climate control box is distinguished by the fact that an air conditioning compressor is arranged in the climate control box and is coupled via the generator to the internal combustion engine. As in an air conditioning system, the air conditioning compressor serves to control the climate of an interior of the motor vehicle, in particular to cool it. The generator can be coupled mechanically to the air conditioning compressor, for example via a clutch. However, the air conditioning compressor can also comprise an electric motor that is connected via a current line to the generator. Via the current line, the air conditioning compressor is coupled electrically, as it were, via the generator to the internal combustion engine.

One further preferred exemplary embodiment of the climate control box is distinguished by the fact that a radiator is arranged in the climate control box and is connected in heat-exchanging terms to the internal combustion engine. The radiator preferably comprises at least one fan and serves to dissipate heat to the surroundings of the climatically controlled box. The heat can be removed from a heating medium, such as heating water, that is fed to the climatically controlled box. However, the heat can also be waste heat that is output via the internal combustion engine during operation.

One further preferred exemplary embodiment of the climate control box is distinguished by the fact that a fuel tank for supplying the internal combustion engine with fuel is arranged in the climate control box. As an alternative, the internal combustion engine can be supplied with fuel externally, for example via corresponding fuel supply connectors.

One further preferred exemplary embodiment of the climate control box is distinguished by the fact that the climate control box has a fuel filling opening for filling fuel into the fuel tank. As an alternative, the fuel tank can be configured such that it can be removed from the climate control box for filling with fuel.

One further preferred exemplary embodiment of the climate control box is distinguished by the fact that the climate control box has plug-in connection connector devices for feeding in and discharging heating medium/cooling medium and refrigerant. Plug and play operation of the climate control box is made possible by the plug-in connection connector devices. Water, which possibly contains suitable additives, can be used, for example, as heating medium/cooling medium. The air conditioning compressor preferably is operated with an environmentally friendly refrigerant.

One further preferred exemplary embodiment of the climate control box is distinguished by the fact that the climate control box has a volume that is smaller than or equal to half a cubic meter. The climate control box advantageously has a volume of approximately 500×400×180 mm.

Furthermore, the invention relates to a motor vehicle having at least one electric drive device and having an above-described climate control box. The motor vehicle is preferably a hybrid vehicle that, in addition to the electric drive device, also contains a further drive device, such as an internal combustion engine, or is a pure electric vehicle that can be driven only with the aid of the electric drive device. The self-sufficient climate control box has the advantage that the electric range of an electrically driven motor vehicle is not influenced, since the on-board electric power network of the vehicle is not accessed. In addition, the climate control box according to the invention makes a particularly compact design with little piping possible.

Furthermore, the invention relates to a method for operating an above-described climate control box in an above-described motor vehicle.

For heating, the air conditioning compressor in the climate control box can be decoupled or switched off. The heating device preferably is configured as an electric heating device and advantageously is operated via the generator. Moreover, the waste heat of the internal combustion engine and the generator can be utilized for heating purposes.

For cooling, the generator is in idling mode, since the heating device does not require any electric current. The air conditioning compressor is advantageously driven by the internal combustion engine. The refrigerating capacity of the air conditioning compressor is advantageously output to the passenger compartment via a refrigerant circuit that already is installed in the motor vehicle.

Further advantages, features and details of the invention result from the following description, in which various exemplary embodiments are described in detail with reference to the drawing.

DETAILED DESCRIPTION OF THE PREFERRED EMBODIMENTS

Figure 1:
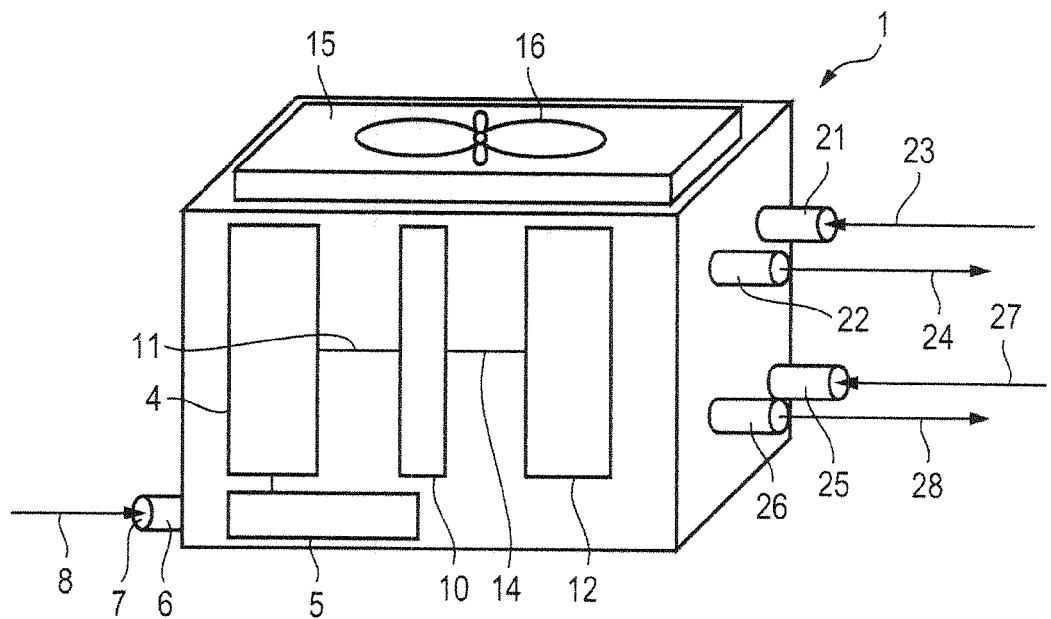
FIG. 1 shows a simplified, perspective illustration of a climate control box according to the invention.
Figure 2:
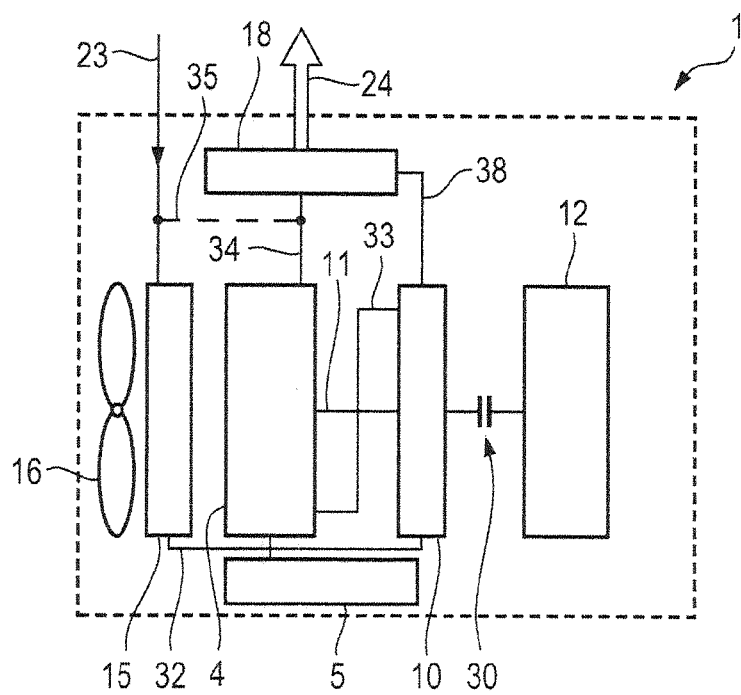
FIG. 2 shows a diagrammatic illustration of a similar climate control box as in FIG. 1.

FIGS. 1 and 2 show a climate control box 1 for a motor vehicle in various illustrations. According to one essential aspect of the invention, an internal combustion engine 4, which is also called a combustion motor, is integrated into the climate control box 1. A fuel tank 5 for supplying the internal combustion engine 4 with fuel is arranged in the climate control box 1. The fuel tank 5 is filled with fuel via a filler neck 6 having a fuel filling opening 7, as is indicated in FIG. 1 by an arrow 8.

Furthermore, a generator 10 is arranged in the climate control box 1. As is indicated by a line 11, the generator 10 is drive-connected to the internal combustion engine 4. Furthermore, an air conditioning compressor 12 is arranged in the climate control box 1. The air conditioning compressor 12, as indicated by a further line 14, is supplied with energy by the generator 10. The air conditioning compressor 12 can comprise an electric motor which is supplied with current by the generator 10.

Furthermore, a radiator 15 which comprises a fan 16 is arranged in the climate control box 1. Furthermore, a heating device 18 is arranged in the climate control box 1 and heating device 18 preferably comprises electric heating elements that are supplied with energy by the generator 10.

The climate control box 1 has substantially the shape of a cuboid, the dimensions of which are, for example, approximately 500×400×180 mm. The dimensions of the climate control box 1 vary depending on various performance classes. In one performance class, for example, the internal combustion engine 4 supplies a power output of 5 kW. As a result of the integrated internal combustion engine 4, the climate control box 1 does not require any electric connectors. The climate control box 1 can be operated in a completely self-sufficient manner, in relation to the drive power of the motor vehicle.

The climate control box 1 is equipped merely with connector devices 21, 22 for feeding in and discharging heating water/cooling water. The heating water/cooling water that enters is indicated by an arrow 23. The heating water/cooling water that exits is indicated by an arrow 24.

Moreover, the climate control box 1 is equipped with connector devices 25, 26 for feeding in and discharging refrigerant. The refrigerant that enters is indicated by an arrow 27. The refrigerant that exits is indicated by an arrow 28.

In FIG. 2, a coupling symbol 30 indicates that the air conditioning compressor 12 can also be coupled mechanically to the generator 10. In the case of mechanical coupling, the air conditioning compressor 12 is driven by the internal combustion engine 4 via the generator 10.

In FIG. 2, a line 32 indicates a heating water line/cooling water line that connects the radiator 15 to the generator 10. A further line 33 indicates a heating water line/cooling water line that connects the generator 10 to the internal combustion engine 4.

The arrow 23 indicates the heating water/cooling water that enters the climate control box 1. The heating water/cooling water that enters is fed to the radiator 15. From the radiator 15, the heating water/cooling water passes via the heating water line/cooling water line 32 into the generator 10. The heating water/cooling water passes via the heating water line/cooling water line 33 into the internal combustion engine 4.

Via a heating water line/cooling water line which is indicated by a further line 34, the heating water/cooling water passes from the internal combustion engine into the heating device 18. From the heating device 18, the heating water/cooling water exits the climate control box 1, as is indicated by the arrow 24.

A dashed line 35 indicates a short-circuit line, via which the heating water/cooling water which enters is guided in the climate control box 1 in the circuit through the components 15, 32, 10, 33, 4 and 34.

Figure 3:
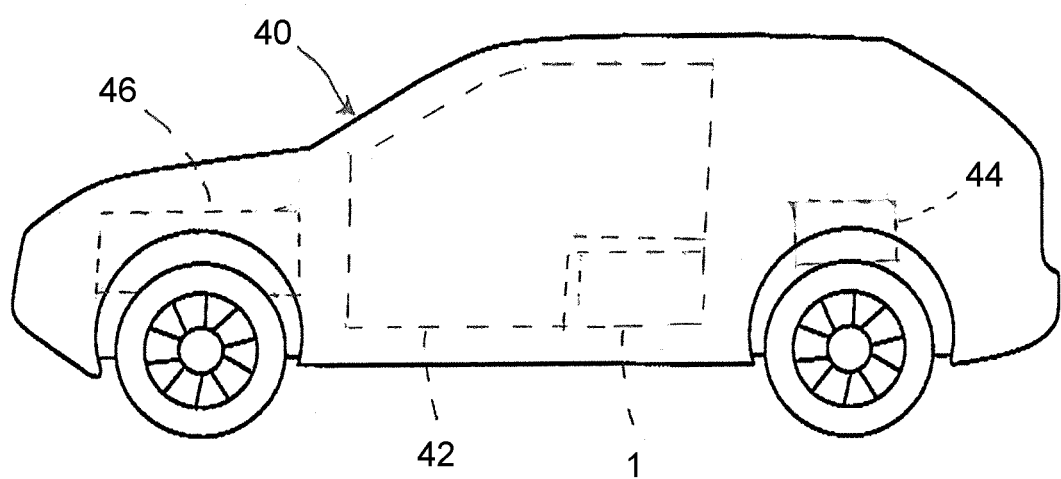
FIG. 3 is a schematic illustration of a motor vehicle with the climate control box of FIG. 1 or 2.

The climate control box 1 according to the invention can be used both for heating and for cooling an interior of the motor vehicle 40, which interior is also called a passenger compartment 42, as illustrated in FIG. 3. The function of a conventional air conditioning system can be assumed completely or partially by the climate control box 1, without drive power of the motor vehicle 40 being required for the climate control, that is to say for heating and cooling the passenger compartment 42. More particularly, the motor vehicle 40 has at least one electric drive device 44 in addition to the above-described climate control box 1. The motor vehicle 40 is preferably a hybrid vehicle that, in addition to the electric drive device 44, also contains a further drive device, such as an internal combustion engine 46, or is a pure electric vehicle that can be driven only with the aid of the electric drive device 44. The passenger compartment 42 of the motor vehicle 40 is climate controlled by the climate control box 1. The self-sufficient climate control box 1 has the advantage that the electric range of the electrically driven motor vehicle 40 is not influenced, since the on-board electric power network of said vehicle 40 is not accessed. In addition, the climate control box 1 makes a particularly compact design with little piping possible.

During heating, the air conditioning compressor 12 is decoupled or switched off. The heating device 18 is supplied with current by the generator 10 via the current line 38. The waste heat of the internal combustion engine 4, the heating device 18 and the generator 10 is utilized for heating purposes.

During cooling, the generator 10 is in idling mode, since the heating device 18 does not require any electric current. The air conditioning compressor 12 is preferably driven mechanically by the internal combustion engine 4 or electrically via the generator 10. During cooling, the short-circuit line 35 is opened, that is to say activated, with the result that the cooling medium remains in the climate control box 1.

The cooling medium is preferably water, optionally with corresponding additives. The same medium, in particular water, preferably is used for heating and cooling. The cooling medium or cooling water is re-cooled during cooling with the aid of the radiator 15.

The invention claimed is:

1. A motor vehicle, comprising:
   a drive device for providing drive power for driving the vehicle;
   a passenger compartment; and
   a self-sufficient climate control box that can be operated without consuming any of the drive power of the drive device for driving the vehicle, the self-sufficient climate control box communicating with the passenger compartment for controlling climate in the passenger compartment, the climate control box comprising:
      an internal combustion engine in the climate control box;
      a generator in the climate control box and being driven by the internal combustion engine;
      a heating device in the climate control box and being selectively in communication with at least one of the internal combustion engine and the generator for selectively heating the passenger compartment; and
      a cooling device in the climate control box and being selectively driven by the internal combustion engine or the generator, wherein the climate control box enables climate control of the passenger compartment without diverting drive power from the drive device for driving the vehicle, and wherein the climate control box has a volume that is smaller than or equal to half a cubic meter.

2. The motor vehicle of claim 1, wherein the cooling device has an air conditioning compressor arranged in the climate control box, the air conditioning compressor being coupled via the generator to the internal combustion engine.

3. The motor vehicle of claim 1, further comprising a radiator arranged in the climate control box, and at least one line for conveying a heat exchange medium between the radiator and the internal combustion engine.

4. The motor vehicle of claim 1, further comprising a fuel tank for supplying the internal combustion engine and arranged in the climate control box.

5. The motor vehicle of claim 4, wherein the climate control box has a fuel filling opening for filling fuel into the fuel tank.

6. The motor vehicle of claim 1, wherein the climatically controlled box has plug-in connection connector devices for feeding in and discharging heating medium/cooling medium and refrigerant.

7. A motor vehicle, comprising:
   a drive device for providing drive power for driving the vehicle;
   a passenger compartment; and
   a self-sufficient climate control box that can be operated without consuming any of the drive power of the drive device for driving the vehicle, the self-sufficient climate control box communicating with the passenger compartment for controlling climate in the passenger compartment, the climate control box comprising:
      an internal combustion engine in the climate control box;
      a generator in the climate control box and being driven by the internal combustion engine;
      a heating device in the climate control box and being selectively in communication with at least one of the internal combustion engine and the generator for selectively heating the passenger compartment; and
      a cooling device in the climate control box and being selectively driven by the internal combustion engine or the generator, wherein the climate control box enables climate control of the passenger compartment without diverting drive power from the drive device for driving the vehicle, and wherein the internal combustion engine is configured to supply a power output of 5 kW.

8. The motor vehicle of claim 7, wherein the drive device for driving the motor vehicle comprises at least one electric drive device.

9. The motor vehicle of claim 8, wherein the internal combustion engine in the climate control box is a first internal combustion engine, and wherein the drive device for driving the motor vehicle further comprises a second internal combustion engine external of the climate control box.

* * * * *